UNITED STATES PATENT OFFICE 1,964,980

COLORED RUBBER PRODUCT

Heinz Eichwede, Frankfort-on-the-Main-Hochst, Germany, assignor to General Aniline Works, Inc., New York, N. Y., a corporation of Delaware No Drawing. Application August 14, 1933, Serial No. 685,152. In Germany August 17, 1932

5 Claims. (Cl. 18—50)

The present invention relates to colored rubber products.

I have found that rubber products (which term is meant to include natural rubber as well as the synthetic products which have a constitution and properties similar to those of natural rubber, as for example polymerization products of butadiene hydrocarbons such as butadiene or isoprene) can be colored in clear scarlet, red to bluish-red shades having very good fastness properties by incorporating with the rubber products or mixtures containing them, prior to vulcanization, water-insoluble azo-dyestuffs of the general formula:

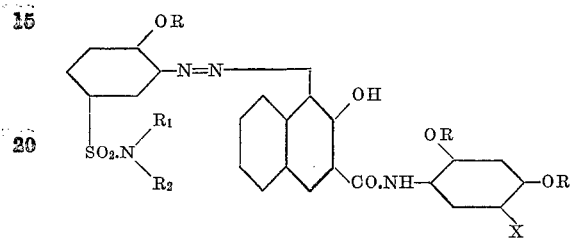

wherein R stands for alkyl, $R_1$ and $R_2$ for alkyl, aralkyl or aryl and X for halogen.

By reason of the said dyestuffs being practically insoluble in rubber, they do not bleed when the rubber products are worked up; neither do they give rise to that phenomenon which is known as blushing or efflorescene when the rubber articles are stored. Furthermore, they are insoluble in benzine which renders them especially suitable also for being used in connection with cold vulcanization processes which are advantageously carried out in the presence of benzine.

The following examples will further illustrate the nature of this invention, but the invention is not restricted to these examples. The parts are by weight.

(1) A rubber mixture is prepared from 100 parts of crepe rubber, 1 part of stearic acid, 2.6 parts of sulfur, 5 parts of zinc white, 1 part of mercapto-benzothiazol, 0.2 part of hexamethylenetetramine, 60 parts of calcium carbonate, 0.6 part of ozocerite, 10 parts of lithopone, 5 parts of titanium dioxide and 3 parts of the azo-dyestuff obtainable by coupling diazotized 1-amino-2-methoxybenzene-5-sulfonic acid-diethyleamide with 1-(2'.3'-hydroxynaphthoylamino)-2.4-dimethoxy-5-chlorobenzene. The mixture is vulcanized in a vulcanization press for 12 minutes at a steam pressure of 3 atmosphere above atmospheric pressure. There is obtained a clear bluish-red vulcanizate of very good fastness properties. By using smaller quantities of dyestuff, clear pink vulcanizates are obtained.

By replacing the above mentioned dyestuff by 3 parts of the azo-dyestuff obtainable by coupling diazotized 1-amino-2-methoxybenzene-5-sulfonic acid-dimethylamide or diazotized 1-amino-2-methoxybenzene-5-sulfonic acid-diphenylamide with 1-(2'.3'-hydroxynaphthoylamino)-2.4-dimethoxy-5-chlorobenzene, red vulcanizates of good fastness properties are obtained.

(2) A rubber mixture is prepared in the usual manner from crepe rubber, the usual admixtures and 3 parts of the azo-dyestuff obtainable by coupling diazotized 1-amino-2-methoxy-benzene-5-sulfonic acid-methylbenzylamide with 1-(2'.3'-hydroxynaphthoylamino) - 2.4 - dimethoxy - 5 - chlorobenzene. The mixture is vulcanized by immersing it for 8 seconds in a solution of 3 parts of sulfur chloride in 97 parts of benzine. The shades and fastness properties of the cold vulcanizate thus obtained are similar to those of the vulcanizate obtainable according to Example 1.

By replacing the dyestuff used in Example 2 by 3 parts of the azo-dyestuff obtainable by coupling diazotized 1-amino-2-methoxybenzene-5-sulfonic acid-dibenzylamide with 1-(2'.3'-hydroxynaphthoylamino)-2.4-dimethoxy-5-chlorobenzene, a red vulcanizate of good fastness properties is obtained.

(3) A mixture is prepared from 100 parts of crepe rubber, 2.8 parts of sulfur, 0.4 part of paraffin oil, 3 parts of stearic acid, 2 parts of brown coal tar oil, 2 parts of colophony, 60 parts of calcium carbonate, 13.5 parts of zinc white, 4 parts of magnesium oxide, 6 parts of caolin, 0.4 part of thiuram and 2 parts of the azo-dyestuff obtainable by coupling diazotized 1-amino-2-ethoxybenzene - 5 - sulfonic acid-N-methylanilide with 1-(2'.3'-hydroxynaphtholyamino)-2.4-dimethoxy - 5 - chlorobenzene. The mixture is vulcanized for 45 minutes in hot air at 120° C. and in this way a red vulcanizate is obtained.

(4) A mixture is prepared from 100 parts of crepe rubber, 2.5 parts of sulphur, 0.35 part of thiuram, 5 parts of zinc white, 0.6 part of ozocerite, 0.5 part of stearic acid and 2 parts of the azo-dyestuff obtainable by coupling diazotized 1-amino-2-methoxybenzene-5-sulfonic acid-dipropylamide with 1-(2'.3'-hydroxynaphtholamino) - 2.4- dimethoxy-5-bromobenzene. The mass is vulcanized in an iron mould in a vulcanization press for 15 minutes at a superatmospheric pressure of 2 atmospheres. A red vulcanizate is thus obtained.

(5) A mixture is prepared from 100 parts of crepe rubber, 50 parts of sulphur, 2 parts of magnesium oxide, 2 parts of mercapto-benzothiazol, 100 parts of titanium dioxide and 5 parts of the azo-dyestuff obtainable by coupling diazotized 1-amino-2-methoxybenzene-5-sulfonic acid-N-methyl-ortho-chloranilide with 1-(2'.3'-hydroxynaphtholamino) - 2.4 - dimethoxy - 5 - chlorobenzene. The mass is vulcanized in a mould by heating for 2½ hours under a steam pressure of 3½ atmospheres above atmospheric pressure. The vulcanizate thus obtained has a red color.

I claim:

1. The process of producing colored rubber products which comprises mixing a rubber product with a water-insoluble azo-dyestuff corresponding to the following general formula:

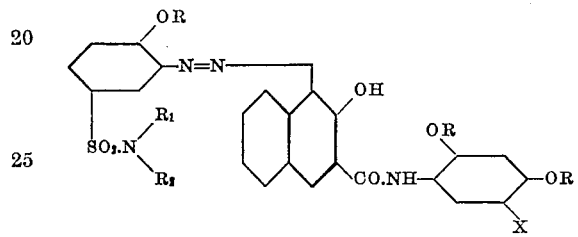

wherein R stands for alkyl, $R_1$ and $R_2$ for alkyl, aralkyl or aryl, and X for halogen, and then vulcanizing the mixture.

2. Colored rubber products containing a water-insoluble azo-dyestuff of the following general formula:

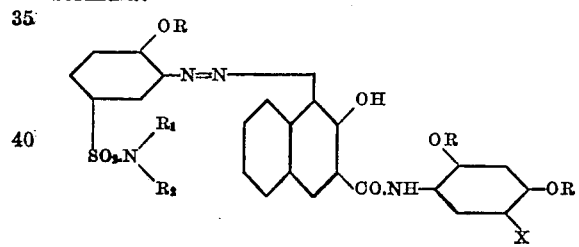

wherein R stands for alkyl, $R_1$ and $R_2$ for alkyl, aralkyl or aryl and X for halogen.

3. Colored rubber products containing a water-insoluble azo-dyestuff of the following general formula:

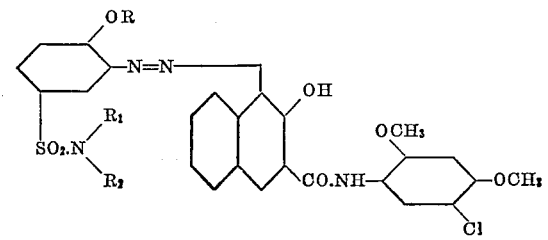

wherein R stands for alkyl and $R_1$ and $R_2$ stand for alkyl, aralkyl or aryl.

4. Colored rubber products containing a water-insoluble azo-dyestuff derived from a 1-amino-2-methoxy-benzene-5-sulfonic acid-dialkylamide and 1-(2'.3' - hydroxynaphthoylamino)-2.4-dimethoxy-5-chlorobenzene.

5. Colored rubber products containing a water-insoluble azo-dyestuff derived from 1-amino-2-methoxybenzene - 5 - sulfonic acid-diethylamide and 1-(2'.3' - hydroxynaphthoylamino) - 2.4-dimethoxy-5-chlorobenzene.

HEINZ EICHWEDE.